US008411236B2

(12) United States Patent
Hong (10) Patent No.: US 8,411,236 B2
(45) Date of Patent: Apr. 2, 2013

(54) TRANSFLECTIVE LIQUID CRYSTAL DISPLAY DEVICE HAVING HIGH APERTURE RATIO AND METHOD OF FABRICATING THE SAME

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 782 days.

(21) Appl. No.: 11/288,245

(22) Filed: Nov. 29, 2005

(65) Prior Publication Data

US 2007/0013625 A1    Jan. 18, 2007

(30) Foreign Application Priority Data

Jun. 27, 2005  (KR) .................. 10-2005-0055621

(51) Int. Cl.
*G02F 1/1335*    (2006.01)
(52) U.S. Cl. ........................................ 349/114
(58) Field of Classification Search .......... 349/113–114
See application file for complete search history.

(56) References Cited

U.S. PATENT DOCUMENTS

| 6,219,118 | B1 * | 4/2001 | Zhang | 349/110 |
| 6,459,465 | B1 * | 10/2002 | Lee | 349/141 |
| 6,704,081 | B2 * | 3/2004 | Ha et al. | 349/114 |
| 2003/0081160 | A1 * | 5/2003 | Ihida et al. | 349/113 |
| 2004/0201803 | A1 * | 10/2004 | Yang et al. | 349/114 |
| 2004/0252263 | A1 * | 12/2004 | Yang et al. | 349/114 |
| 2005/0018113 | A1 * | 1/2005 | Shen et al. | 349/114 |
| 2005/0036088 | A1 * | 2/2005 | Okumura | 349/114 |
| 2005/0046764 | A1 * | 3/2005 | Enda et al. | 349/43 |
| 2005/0231666 | A1 * | 10/2005 | Kim et al. | 349/114 |
| 2006/0061716 | A1 * | 3/2006 | Yamaguchi et al. | 349/114 |

FOREIGN PATENT DOCUMENTS

CN    1538227 A    10/2004

* cited by examiner

*Primary Examiner* — Lauren Nguyen
(74) *Attorney, Agent, or Firm* — Morgan, Lewis & Bockius LLP (57) ABSTRACT

A transflective liquid crystal display device including a first substrate including a plurality of pixel regions, each of the pixel regions having a transmissive portion and a reflective portion, a gate line on the first substrate along a first direction, a data line along a second direction transverse to the first direction and crossing the gate line, an organic layer formed over the gate line and the data line, a switching device connected to the gate line and the data line, a transparent pixel electrode formed on the transmissive region and connected to the switching device, a reflective layer formed on the reflective region, the reflective layer having an open portion that exposes the pixel electrode on the transmissive region, wherein the reflective layer covers the gate line and the data line, and the organic layer covered by the reflective layer has a step profile at a side portion along a periphery of the organic layer, and a liquid crystal layer between the first substrate and a second substrate.

25 Claims, 10 Drawing Sheets

TRANSFLECTIVE LIQUID CRYSTAL DISPLAY DEVICE HAVING HIGH APERTURE RATIO AND METHOD OF FABRICATING THE SAME

The present invention claims the benefit of Korean Patent Application No. 2005-0055621, filed in Korea on Jun. 27, 2005, which is hereby incorporated by reference.

BACKGROUND OF THE INVENTION

1. Field of the Invention

The present invention relates to a liquid crystal display device (LCD), and more particularly, to a transflective LCD device and a method of fabricating the same.

2. Discussion of the Related Art

Generally, a transflective liquid crystal display (LCD) device functions both as a transmissive LCD device and a reflective LCD device. Transflective LCD devices are more versatile because they can use both a backlight and ambient light as light sources. Moreover, transflective LCD devices have low power consumption.

Figure 1:
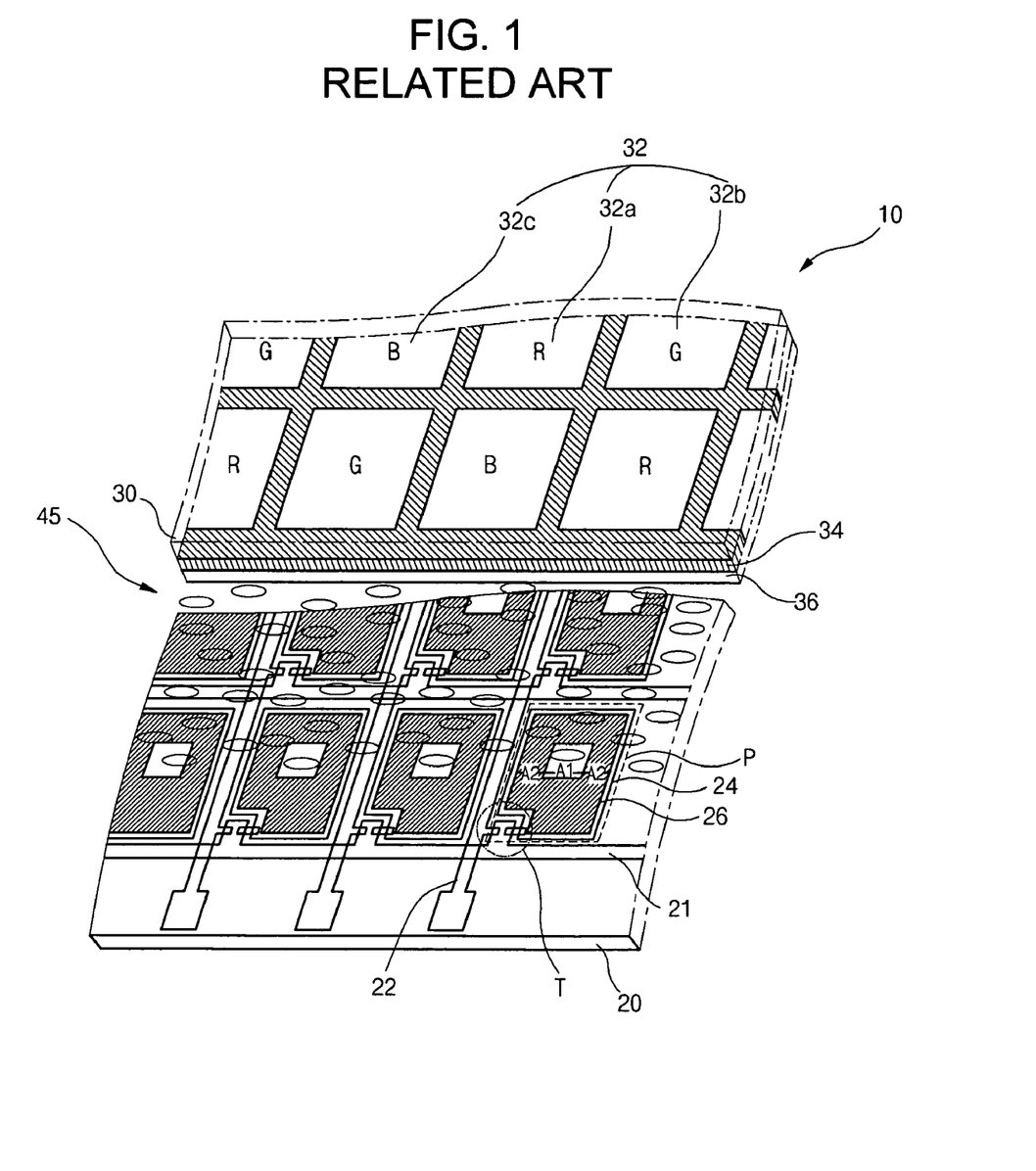
FIG. 1 is an exploded perspective view of an LCD device according to the related art.

FIG. 1 is an exploded perspective view of an LCD device according to the related art. As shown in FIG. 1, an LCD device 10 has an upper substrate 30 having a black matrix 34. A color filter layer 32 of the LCD device 10 includes red, green, and blue sub-color filters 32a, 32b, and 32c, respectively. The LCD device 10 includes a common electrode 36 on the color filter layer 32, and a lower substrate 20 having a switching element, such as a thin film transistor (TFT) T, and a transparent electrode 24 connected to the TFT T. A liquid crystal layer 45 is interposed between the upper and lower substrates 30 and 20. The lower substrate 20 is referred to as an array substrate because an array of lines, including gate lines 21 and data lines 22, is formed thereon. The gate lines 21 and the data lines 22 cross each other to form a matrix. The TFT T is connected to one of the gate lines 21 and one of the data lines 22. The TFT T is formed near a crossing of the gate lines 21 and the data lines 22. The transparent electrode 24 is formed of a transparent conductive material, such as indium-tin-oxide (ITO) and indium-zinc-oxide (IZO), in the pixel region P. A reflective electrode 26 includes a reflective metallic material, such as aluminum (Al), and has an opening portion exposing a portion of the transparent electrode 24. The opening portion defines a transmissive region A1 and a region of the reflective layer 26 excluding the opening portion defines a reflective region A2. The transmissive region A1 and the reflective region A2 constitute a pixel region P. The upper substrate 30 is referred to as a color filter substrate because the color filter layer 32 is formed thereon. As explained above, the transmissive region A1 and the reflective region A2 can be manufactured having various shapes.

Figure 2:
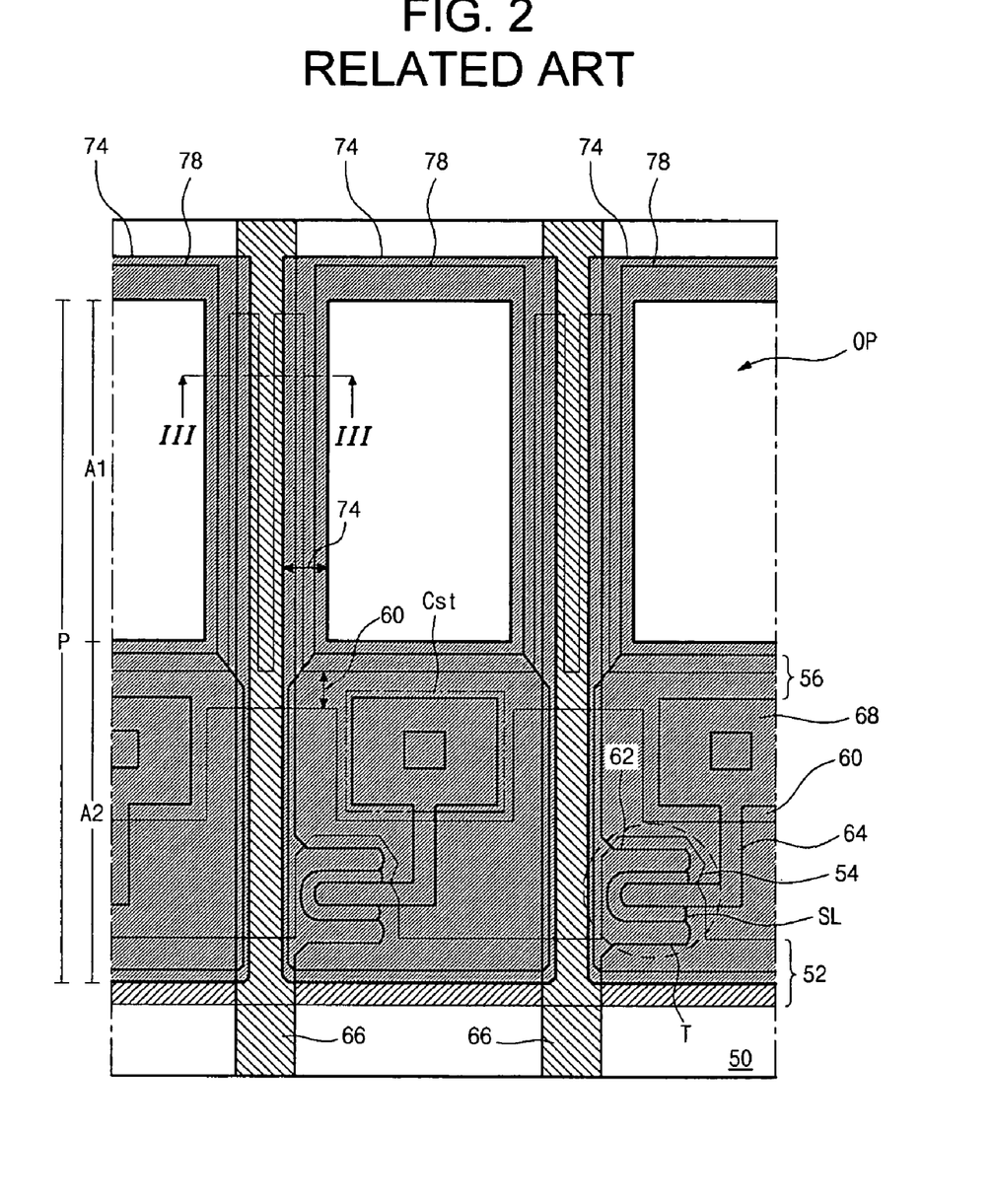
FIG. 2 is a schematic plan view of an array substrate for a transflective LCD device according to the related art.

FIG. 2 is a schematic plan view of an array substrate for a transflective LCD device according to the related art. As shown in FIG. 2, a first substrate 50 includes a pixel region P that includes a transmissive region A1 and a reflective region A2. A gate line 52 is formed on the first substrate 50 along a first direction, and a data line 66 crosses the gate line 52 along a second direction. A reflective layer 74 is disposed in the reflective region A2 and has an open portion OP corresponding to the transmissive region A1. A pixel electrode 78 of a transparent electrode is exposed by the open portion OP.

A thin film transistor T is formed near a crossing of the gate line 52 and the data line 66 and includes a gate electrode 54, a semiconductor layer SL, a source electrode 62 and a drain electrode 64. A common line 56 is formed along the first direction and is spaced apart from the gate line 52. A first capacitor electrode 60 is extended from the common line 56 and a second capacitor electrode 68 is extended from the drain electrode 64, wherein the first capacitor electrode 60, the second capacitor electrode 68, and an insulating layer (not shown) therebetween constitute a storage capacitor Cst.

The transmissive regions A1 and the reflective regions A2 of the respective pixel regions P are disposed in parallel to each other. Further, the reflective layer 74 is patterned in the pixel region P and is spaced apart from an adjacent reflective layer 74. Accordingly, the data lines 66 are exposed by the space between the reflective layers 74. Hence, the exposed regions of the data line 66 need to be covered using a light interception means such as a black matrix.

Figure 3:
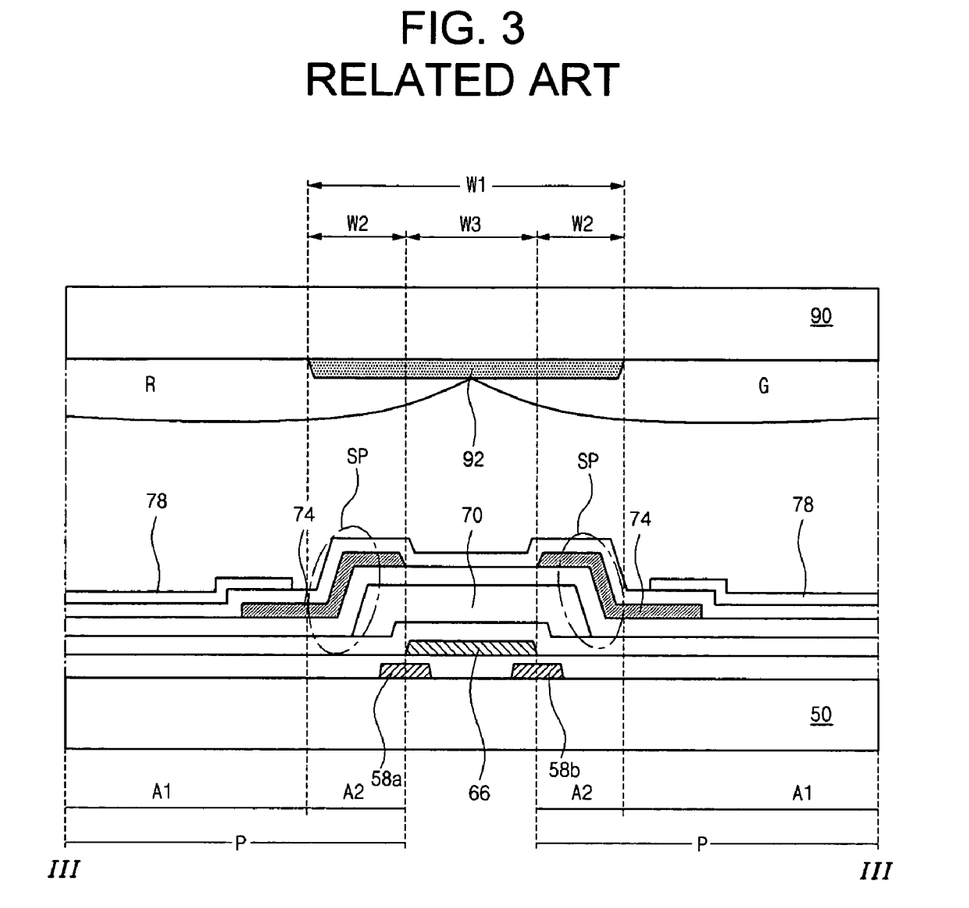
FIG. 3 is a schematic cross sectional view taken along a line III-III of FIG. 2 according to the related art.

FIG. 3 is a schematic cross sectional view taken along a line III-III of FIG. 2 according to the related art. As shown in FIG. 3, a first substrate 50 includes a pixel region P, a first common line pattern 58a, and a second common line pattern 58b, the first and second common line patterns 58a and 58b being extended from the common electrode 56 (of FIG. 2). A data line 66 is formed over the first and second common line patterns 58a and 58b in a non-pixel region (not shown) that is disposed in a periphery of the pixel region P. An organic layer 70 is formed over the data line 66 to prevent an electric interference, and a reflective layer 74 is formed over the organic layer 70.

The reflective layer 74 covers a side portion SP of the organic layer 70 having a step difference including a portion of the pixel region P. A transparent pixel electrode 78 is independently formed in the pixel region P. Substantively, because the pixel electrode 78 is formed in the transmissive region A1 as well as the reflective region A2, the reflective layer 74 does not act as an electrode.

An aperture region of the transflective LCD device depends on a size of the transmissive region A1. However, the transflective LCD device according to the related art has space limitations preventing expansion of the aperture region. Because the transmissive regions A1 and the reflective regions A2 of the pixel regions P are aligned side-by-side, the potential for signal interference between the pixel electrode 78 of one pixel region and the data line 66 of an adjacent pixel region, a workable space for each pixel region is predetermined based on the dimensions of the electrical components of the LCD device.

In the related art, the mentioned organic layer 70 is formed to minimize the electric interference between the pixel electrode 78 and the data line 66. The inclusion of the organic layer 70 creates a step difference in the side portion SP of the organic layer 70. This step profile allows light to leak out in portions of the pixel electrode 78 covered by the side portions SP of the organic layer 70 because the portions of the pixel electrode 78 corresponding to the side portions SP of the organic layer 70 are misaligned. The main role of the organic layer 70 is to provide a gap between the reflective region A2 and the transmissive region A1, such as a cell gap ratio of 1 to 2 (1:2), in order to obtain a uniform optical effect. Accordingly, the step difference of the side portion SP of the organic layer 70 is necessarily present in a cell gap structure of the transflective LCD device of the related art.

In order to minimize the visual effect of the light leakage around the side portions SP, a black matrix 92 is formed on a second substrate 90. In the transflective LCD device of the related art, the black matrix 92 needs to have a width (W1) that includes widths of the side portions SP (W2) as well as a width of the data line 66 (W3). As a result, the transflective LCD device according to the related art has limited aperture ratio that cannot be readily increased due to the structural arrangement between the transmissive region A1 and the reflective region A2 having the cell gap difference between the transmissive region A1 and the reflective region A2. Although not explained above, the second substrate 90 further includes a color filter layer on the black matrix 92 and a common electrode (not shown) on the color filter layer, and a liquid crystal layer is interposed between the first and second substrates 50 and 90.

SUMMARY OF THE INVENTION

Accordingly, the present invention is directed to a transflective LCD device and a method of fabricating the same that substantially obviates one or more problems due to limitations and disadvantages of the related art.

It is an object of the present invention to provide a transflective LCD device having high aperture ratio.

Another object of the present invention is to provide a method of fabricating a transflective LCD device having high aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective LCD device includes a first substrate including a plurality of pixel regions, each of the pixel regions having a transmissive portion and a reflective portion, a gate line on the first substrate along a first direction, a data line along a second direction transverse to the first direction and crossing the gate line, an organic layer formed over the gate line and the data line, a switching device connected to the gate line and the data line, a transparent pixel electrode formed on the transmissive region and connected to the switching device, a reflective layer formed on the reflective region, the reflective layer having an open portion that exposes the pixel electrode on the transmissive region, wherein the reflective layer covers the gate line and the data line, and the organic layer covered by the reflective layer has a step profile at a side portion along a periphery of the organic layer, and a liquid crystal layer between the first substrate and a second substrate.

In another aspect, a method of fabricating a transflective liquid crystal display device includes forming a gate line on the first substrate along a first direction, the first substrate including a plurality of pixel regions, each of the pixel regions having a transmissive portion and a reflective portion, forming a data line over the gate line along a second direction crossing the first direction, forming an organic layer covering the gate line and the data line, forming a switching device connected to the gate line and the data line, forming a pixel electrode on the transmissive region and connecting the pixel electrode to the switching device, forming a reflective layer on the reflective region having an open portion that exposes the pixel electrode on the transmissive region, wherein the reflective layer covers the gate line and the data line, and the organic layer covered by the reflective layer has a step profile at a side portion along a periphery of the organic layer, attaching the first substrate and a second substrate, and forming a liquid crystal layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

It will be apparent to those skilled in the art that various modifications and variations can be made in the transreflective LCD device of the present invention without departing from the spirit or scope of the invention. Thus, it is intended that the present invention cover the modifications and variations of this invention provided they come within the scope of the appended claims and their equivalents.

DETAILED DESCRIPTION OF THE PREFERRED EMBODIMENT

Reference will now be made in detail to the preferred embodiments of the present invention, examples of which are illustrated in the accompanying drawings.

Figure 4:
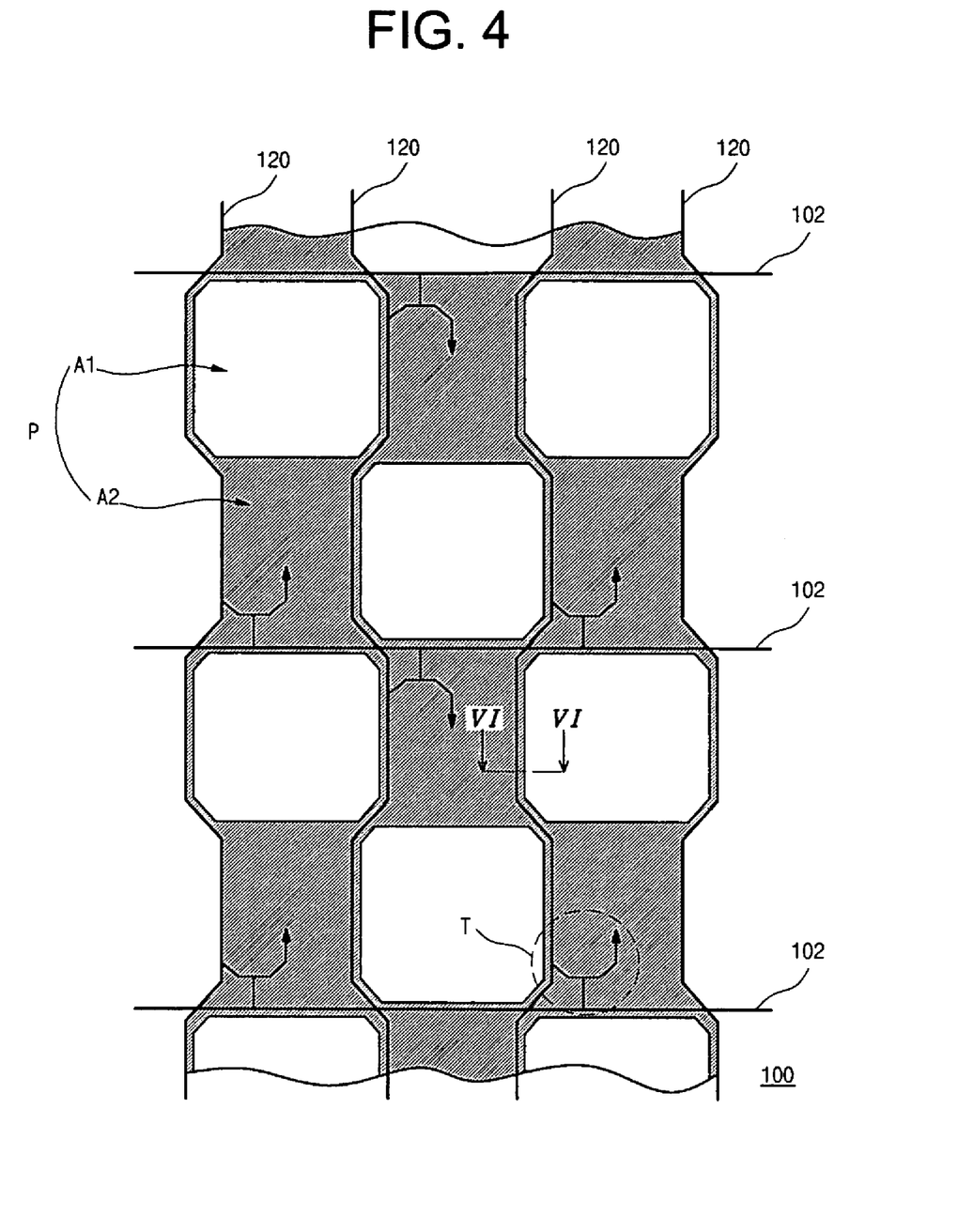
FIG. 4 is a schematic plan view of an array substrate for a transflective liquid crystal display (LCD) device according to an exemplary embodiment of the present invention.
Figure 5:
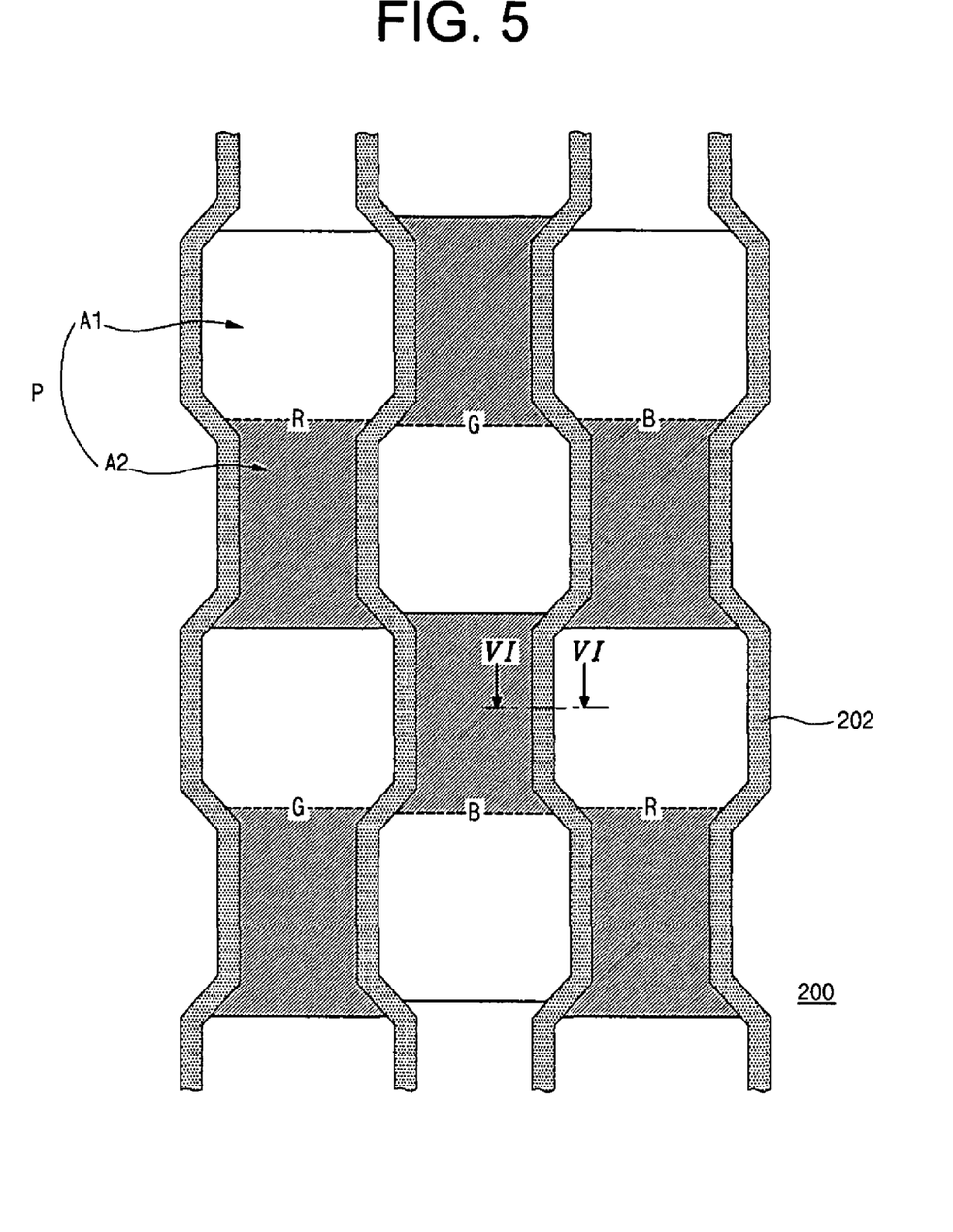
FIG. 5 is a schematic plan view of a color filter substrate for a transflective LCD device according to an exemplary embodiment of the present invention.

FIG. 4 is a schematic plan view of an array substrate for a transflective liquid crystal display (LCD) device according to an exemplary embodiment of the present invention. FIG. 5 is a schematic plan view of a color filter substrate for a transflective LCD device according to an exemplary embodiment of the present invention.

In FIG. 4, a first substrate 100 includes a pixel region P that has a transmissive region A1 and a reflective region A2. A plurality of gate lines 102 and a plurality of data lines 120 crossing the plurality of gate lines 102 are formed on the first substrate 100. A thin film transistor T is formed near a crossing of the gate lines 102 and the data lines 120.

An exemplary embodiment of the first substrate 100 as shown in FIG. 4 includes a transmissive region A1 having a larger size than the reflective region A2. However, the transmissive portion and the reflective portion according to the present invention do not have to have different sizes. The difference in sizes contributes to improving an aperture ratio of the transflective LCD device according to the present invention, which can also be improved by increasing the available size of both transmissive portion and reflective portion. The pixel regions P adjacent to each other are conversely disposed such that the transmissive region A1 of the pixel region P is directly next to the reflective region A2 of the adjacent pixel region P. In other words, the transmissive regions A1 are arranged in a zigzag pattern with respect to the entirety of pixel regions P.

The data lines 120 are disposed within the reflective region A2. Accordingly, the region of the plurality of data lines 120 depends on the reflective region A2. Therefore, because a boundary of the transmissive region A1 and the reflective region A2 has a zigzag shape along a direction of the data lines 120 due to size differences between the transmissive region A1 and the reflective region A2, each of the plurality of data lines 120 also has a zigzag shape corresponding to the boundary. However, the data line 120 according to the present invention is not limited to the zigzag shape. For instance, data line 120 may be formed as a straight type data line.

In FIG. 5, a black matrix 202 is formed on a second substrate 200 and is arranged to correspond to the boundary portion between the transmissive region A1 and the reflective region A2 of the first substrate 100 (FIG. 4). The size of the black matrix 202 is reduced in comparison with that of the related art for the reasons explained further below. Accordingly, the black matrix 202 according to the present invention provides an increased aperture region.

Figure 6:
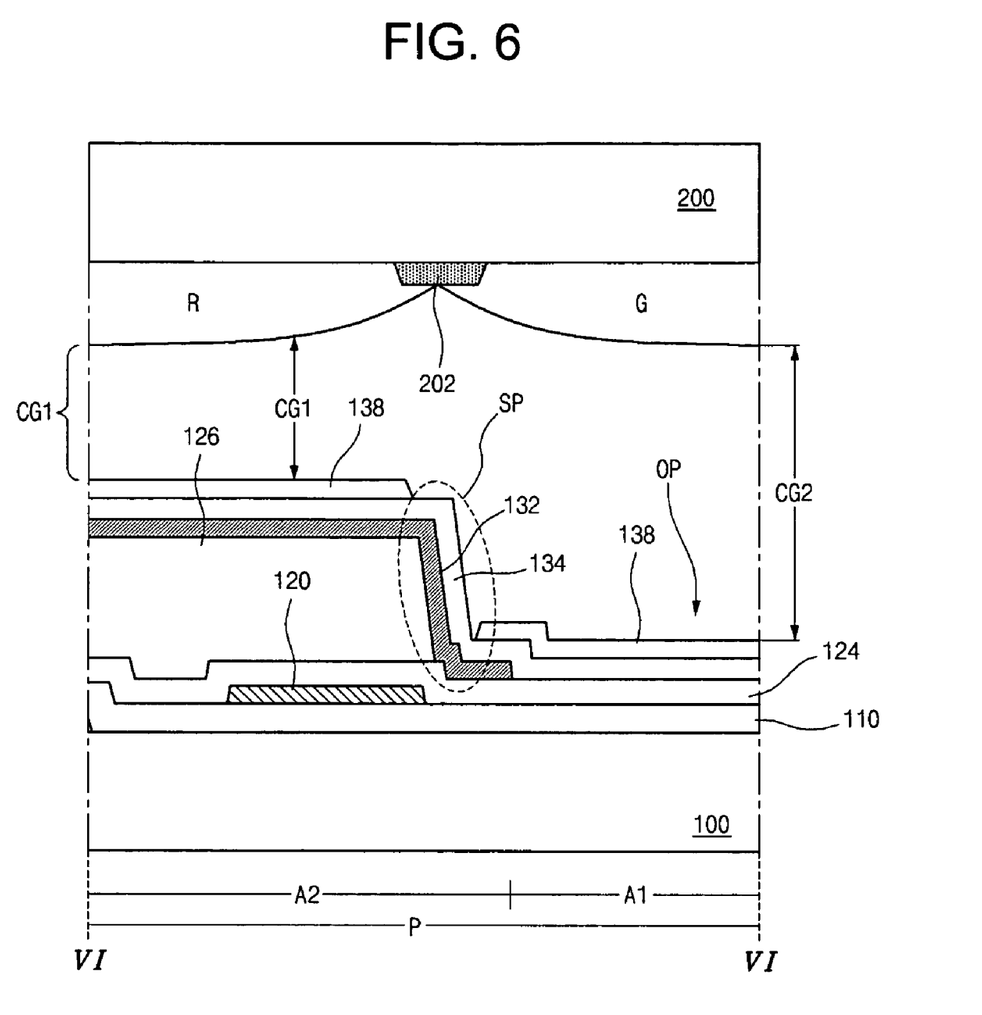
FIG. 6 is a schematic cross sectional view of a transflective LCD device taken along a line VI-VI of FIGS. 4 and 5.

FIG. 6 is a schematic cross sectional view of a transflective LCD device viewed along line VI-VI of FIGS. 4 and 5, respectively. As shown in FIG. 6, a gate insulating layer 110 is formed on a first substrate 100, a data line 120 is formed on the gate insulating layer 110, a passivation layer 124 is formed on an entire surface of the data line 120, and an organic layer 126 is formed on the passivation layer 124 corresponding to the data line 120 to prevent an electric interference. A reflective layer 132 is formed on the organic layer 126 and has an opening portion OP in the transmissive region A1. The organic layer 126 has a side portion SP having a step difference and the reflective layer 132 covers the side portion SP of the organic layer 126. An interlayer 134 is formed on an entire surface of the reflective layer 132 and the passivation layer 124 exposed by the open portion OP, and a transparent pixel electrode 138 is formed on the interlayer 134 over the open portion OP. The pixel electrode 138 is spaced apart from an adjacent pixel electrode 138, as shown in FIG. 4, and is divided by the pixel region P. Here, for purposes of example, the pixel electrode 138 may be extended to overlap a portion of the data line 120. Although not shown, the organic layer 126 covers a gate line as well as the data line 120.

The black matrix 202 is formed on the second substrate 200 and corresponds to a boundary between the transmissive region A1 of a pixel region P and the reflective region A2 of an adjacent pixel region P. Specifically, the black matrix 202 covers the side portion SP of the organic layer 126 and the reflective layer 132 having the step difference. The second substrate 200 further includes a color filter layer on the black matrix 202 and a common electrode (not shown) on the color filter layer, and a liquid crystal layer is interposed between the first and second substrates 100 and 200.

Since the data line 120 is covered by the reflective layer 132, the black matrix 202 does not correspond to the width of the data line 120. Consequently, the black matrix 202 may be formed with a significantly smaller width than that of the related. For example, the width may be reduced up to 16 micrometers. Moreover, a first cell gap CG1 in the reflective region A2 may be less than half of a second cell gap CG2 in the transmissive region A1. Here, a thickness of the interposed liquid crystal layer is defined as a cell gap CG. A cell gap difference ΔCG (i.e., CG2-CG1) between the transmissive region A1 and the reflective region A2 is created by the step difference of the organic layer 126.

Figure 7:
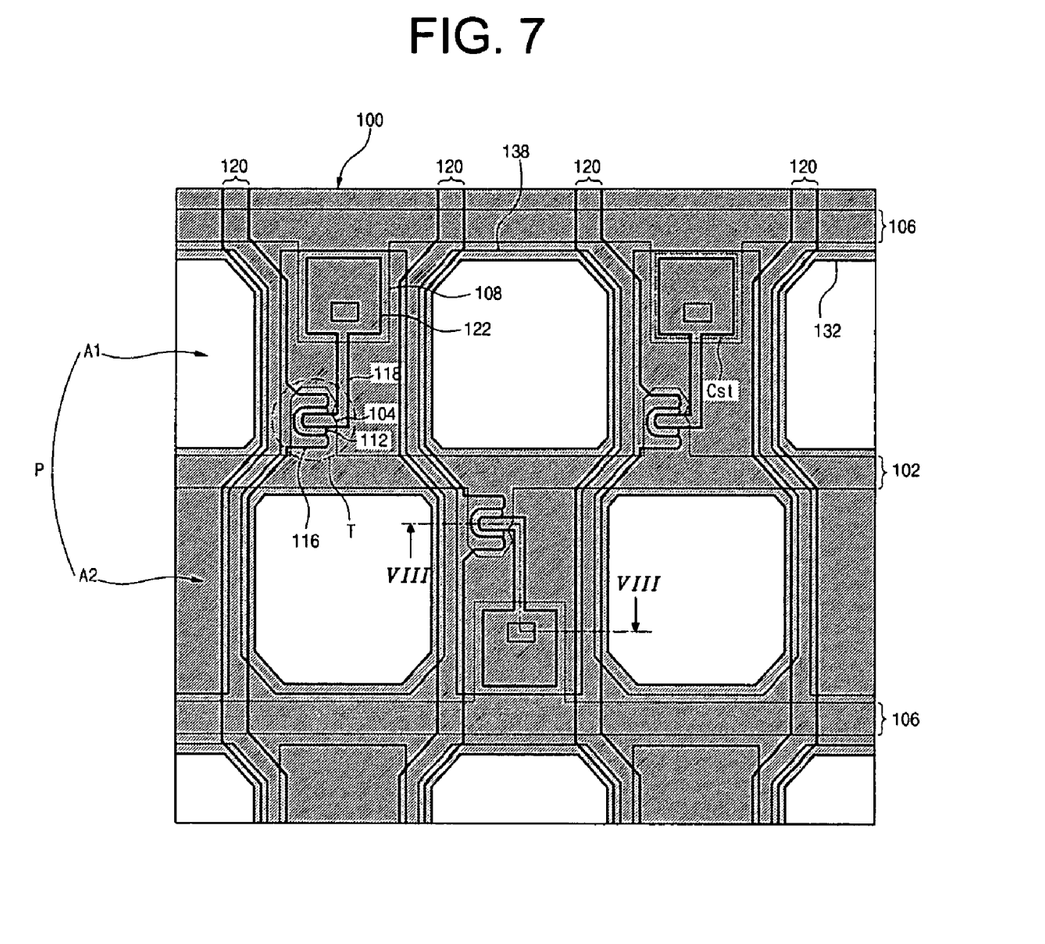
FIG. 7 is a detailed plan view of an array substrate for a transflective LCD device according to an exemplary embodiment of the present invention.

Hereinafter, a specific structure of the array structure will be explained referring to FIG. 7. FIG. 7 is a plan view of an array substrate for a transflective LCD device according to an exemplary embodiment of the present invention. As shown in FIG. 7, a first substrate 100 includes a plurality of pixel regions P, where each of the plurality of pixel regions P includes a transmissive region A1 and a reflective region A2.

For illustrative purposes only, the transmissive region A1 of a middle pixel region P is shown surrounded by the reflective regions A2 at the top, bottom, right, and left sides of the transmissive region A1. Accordingly, the reflective region A2 of the middle pixel region P is shown surrounded by the transmissive regions A1 at the top, bottom, right, and left sides of the reflective region A2.

A plurality of gate lines 102, a plurality of data lines 120 crossing the plurality of gate lines 102, and a plurality of common lines 106 parallel to the plurality of gate lines 102 are formed on the first substrate 100 in a predetermined space. Here, for purposes of example, the plurality of gate lines 102, the plurality of data lines 120, and the plurality of common lines 106 are formed within the reflective regions A2.

It is noted that the width of the transmissive region A1 in the parallel direction of the gate line 102 is greater than the width of the reflective region A2 in order to increase an aperture ratio. Accordingly, the boundaries between the pixel regions P have a zigzag shape along a direction of the data line 120 due to the differences in width between the reflective region A2 and the transmissive region A1. However, the data line according to the present invention is not limited to the zigzag shape. For instance, the data line may be formed as a straight type data line. Alternatively, the transmissive portion and the reflective portion according to the present invention do not necessarily have to have different sizes. For instance, the aperature ratio may also be improved by increasing an available size of both transmissive portion and reflective portion.

In the exemplary embodiment shown in FIG. 7, the data line 120 is formed within the reflective region A2. Accordingly, its shape depends on the boundary between the pixel regions P along the parallel direction to the data line 120. For example, the data line 120 as shown in FIG. 7 has a zigzag shape corresponding to the boundary of the pixel regions P.

The thin film transistor T formed near a crossing of the gate line 102 and the data line 120 is connected to the gate line 102 and the data line 120. The thin film transistor T includes a gate electrode 104 connected to the gate line 102, an active layer 112 made of a semiconductor layer over the gate electrode 104, a source electrode 116 connected to the data line 120, and a drain electrode 118 spaced apart from the source electrode 116. The common line 106 includes a first capacitor electrode 108. The drain electrode 118 includes a second capacitor electrode 122 in the reflective region A2. The first capacitor electrode 108, the second capacitor electrode 122, and an insulating layer (not shown) therebetween constitute a storage capacitor Cst.

The transparent pixel electrode 138 is formed in the pixel region P and is connected to the drain electrode 118 while the reflective layer 132 is formed in the reflective region A2. Although not shown, an organic layer covers the data line 120 and a gate line 102 to prevent an electric interference. The reflective layer 132 may be divided into the pixel region P taking into account electric controls between the first and second substrates.

Figure 8A:
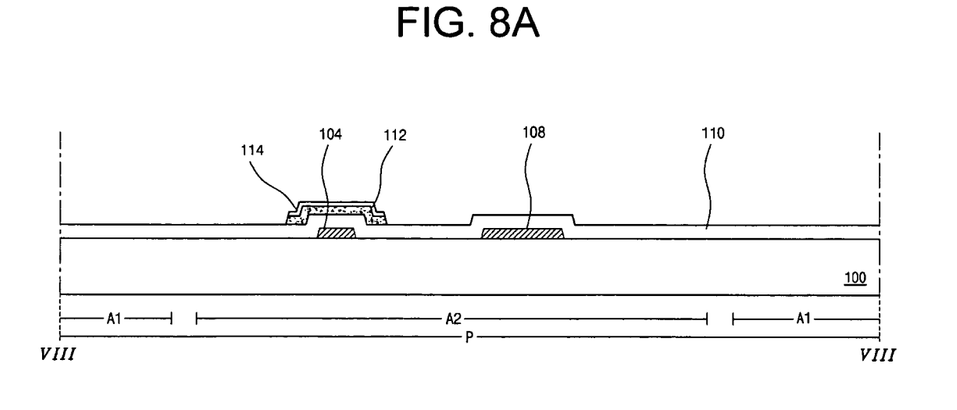
FIGS. 8A to 8F are schematic cross sectional views of an exemplary array substrate for a transflective LCD device taken along a line VIII-VIII of FIG. 7 during an exemplary fabrication process according to the present invention.

FIGS. 8A to 8F are schematic cross sectional views of an exemplary array substrate for a transflective LCD device taken along line VIII-VIII of FIG. 7 during an exemplary fabrication process according to the present invention. As shown in FIG. 8A, a first substrate 100 includes a pixel region P that has a transmissive region A1 and a reflective region A2. As shown in FIG. 7, the pixel region P and an adjacent pixel region P are arranged such that the transmissive region A1 and the reflective region A2 of the pixel region P and the transmissive region A1 and the reflective region A2 of the adjacent pixel region P are conversely disposed in relation to each other.

A gate line 102 (of FIG. 7) is formed on the first substrate 100 along a first direction within the reflective region A2 and includes a gate electrode 104. A common line 106 (of FIG. 7) is formed along the first direction and is spaced apart from the gate line 102 (of FIG. 7) within the reflective region A2. A first capacitor electrode 108 is extended from the common line 106 within the reflective region A2. The gate line 102 and the common line 106 may be formed using aluminum (Al), Al alloy, chromium (Cr), molybdenum (Mo), or other metallic materials. Further, the gate line 102 and the common line 106 may be a single layer or a double layer having Al or other metallic materials. Specifically, although Al reduces signal delay, Al has weak physical and chemical properties. Therefore, other metallic materials may be used to compensate for the weaker properties of the Al layer.

Next, a gate insulating layer 110 is formed by depositing, for example, an inorganic material such as silicon nitride (SiNx) and silicon oxide (SiOx) on an entire surface of the gate line 102 and the common line 106. An intrinsic amorphous silicon layer and doped amorphous silicon layer are sequentially formed on the gate insulating layer 110 and patterned into an active layer 112 and an ohmic contact layer 114, respectively. The active layer 112 is disposed over the gate electrode 104 and the ohmic contact layer 114 is disposed on the active layer 112.

Figure 8B:
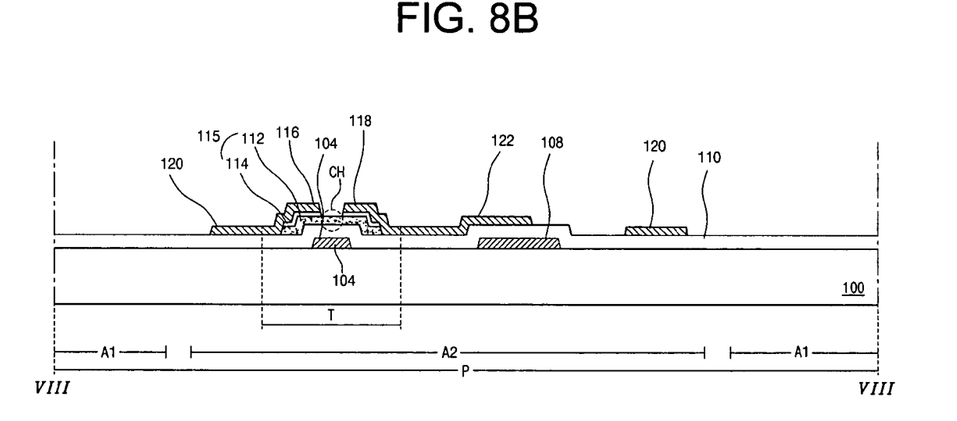

As shown in FIG. 8B, a data line 120, a source electrode 116 connected to the data line 120, and a drain electrode 118 spaced apart from the source electrode 116 are formed by depositing a conductive metallic material such as chromium (Cr), molybdenum (Mo), tantalum (Ta), titanium (Ti), and copper (Cu). Further, a second capacitor electrode 122 is extended from the drain electrode 118 within the reflective region A2. As shown in FIG. 7, the data line 120 is formed such that the data line 120 crosses the gate line 102. The data line 120 is formed within the reflective region A2 such that the shape of the data line 120 conforms to the shape of the boundary between the transmissive region A1 and the reflective region A2.

Then, a portion of the active layer 112 is exposed by removing a portion of the ohmic contact layer 114 between the source and drain electrodes 116 and 118 to make a channel region CH. The active layer 112 and the ohmic contact layer 114 constitute a semiconductor layer 115. The gate electrode 102, the semiconductor layer 115, the source and drain electrodes 116 and 118, in turn, constitute a thin film transistor T.

Figure 8C:
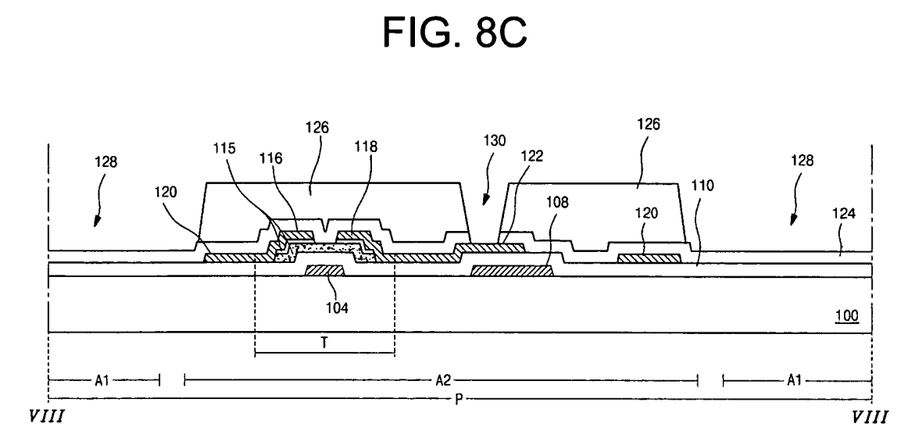

As shown in FIG. 8C, a passivation layer 124 is formed by depositing, for example, an inorganic material, such as one of SiNx and SiOx, on an entire surface of the thin film transistor T. Next, an organic layer 126 is formed by coating, for example, an organic material, such as acrylic resin and benzocyclobutene (BCB), on an entire surface of the passivation layer 124. Organic material such as acrylic resin and BCB is used because a desired thickness can be achieved with only one coating process due to their viscosity. However, other appropriate materials and process may be used without departing from the spirit of the invention.

Then, a first contact hole 130 is formed through the passivation layer 124 and the organic layer 126 that exposes a portion of the second capacitor electrode 122. In addition, the organic layer 126 has a first opening portion 128 exposing the transmissive region A1. It is noted that the organic layer 126 covers the data line 120. Although not shown, the organic layer 126 also covers the gate line 102.

Figure 8D:
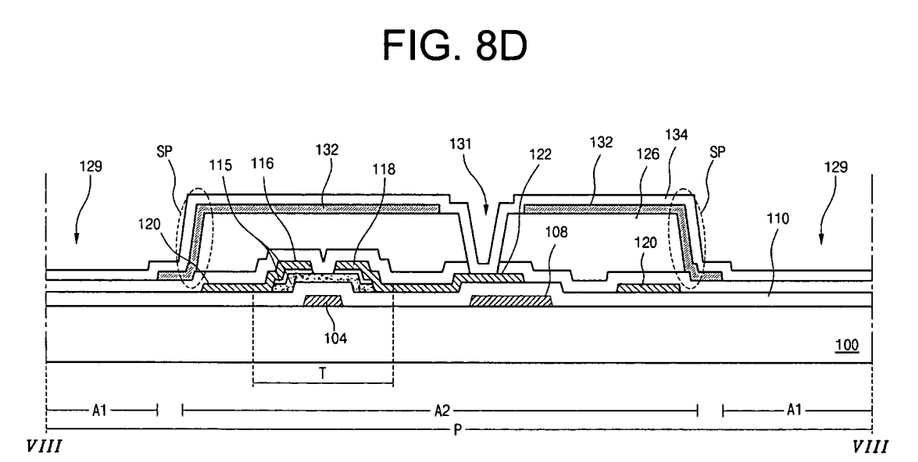

As shown in FIG. 8D, a reflective layer 132 is formed by depositing, for example, a reflective metallic material such as Al on the organic layer 126. The reflective layer 132 has a second opening portion 129 corresponding to the first opening portion 128. A second contact hole 131 aligned with the first contact hole 130 exposes the second capacitor electrode 122. It is noted that the reflective layer 132 covers the data line 120. Further, the reflective layer 132 covers the side portion SP of the organic layer having a step difference.

Next, an interlayer 134 is formed by depositing, for example, an inorganic layer on an entire surface of the reflective layer 132. Although not shown, an inorganic layer may further be formed between the organic layer 126 and the reflective layer in order to improve the contact properties thereof.

Figure 8E:
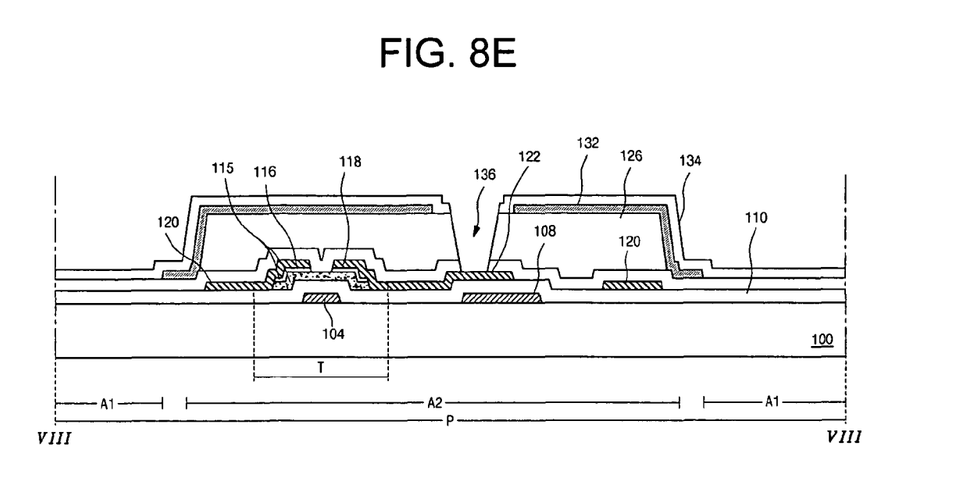

As shown in FIG. 8E, a third contact hole 136 is formed by removing a portion of the interlayer 134 where the first and second contact holes 130 and 131 (of FIGS. 8C and 8D) were to expose the second capacitor electrode 122. Herein, the third contact hole 136 will be referred as a drain contact hole 136 for convenience.

Figure 8F:
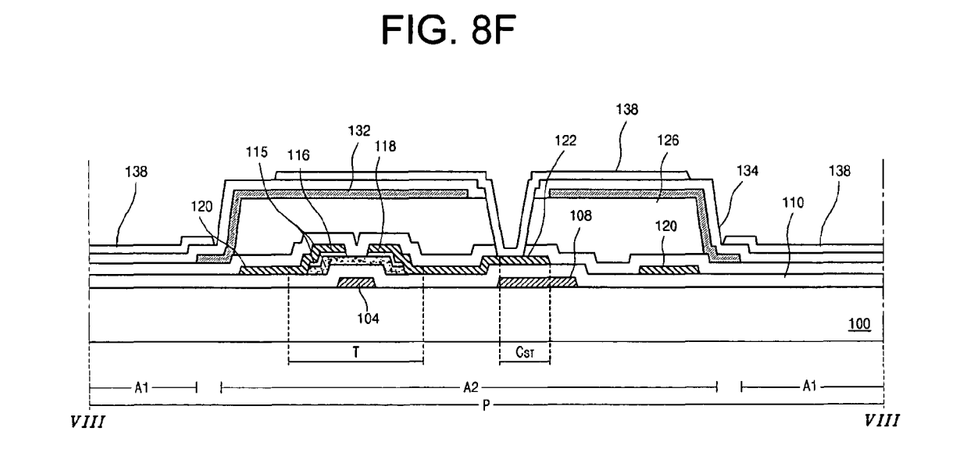

As shown in FIG. 8F, a pixel electrode 138 is formed by depositing, for example, a transparent conductive material, such as indium tin oxide (ITO) and indium zinc oxide (IZO), on the interlayer 134 in the pixel regions P. The pixel electrode 138 is connected to the second capacitor electrode 122 via the drain contact hole 136. Generally, the pixel electrode 138 is connected to the drain electrode 118, but the pixel electrode 138 according to an exemplary embodiment of the present invention as shown in FIG. 8F is connected to the second capacitor electrode 122 extended from the drain electrode 118.

The transparent pixel electrode 138 is disposed in the reflective region A2 as well as the transmissive region A1. For example, the pixel electrode 138 is disposed over the data line 120, which is also covered by the reflective layer 132. Therefore, a black matrix (not shown) on a second substrate 200 (of FIG. 6) opposing the first substrate 100 does not have to cover the data line 120. Accordingly, the black matrix according to the exemplary embodiment of the present invention may be formed corresponding only to the width of the boundary between the transmissive region A1 and the reflective region A2—i.e., the side portion SP of the organic layer 126 and the reflective layer 132 having the step difference.

Although not shown, the color filter layer may be formed on the first substrate 100. However, the color filter layer may also be formed on the second substrate 200 (of FIG. 6).

A transflective LCD device according to the exemplary embodiments of the present invention has the following advantages. An aperture region of the transflective LCD device with significant increase in size may be obtained since the black matrix does not have to cover the data line within the reflective region. Therefore, the transflective LCD device according to the present invention provides higher quality images due to higher aperture ratio and brighter images.

It will be apparent to those skilled in the art that various modifications and variations can be made in the transflective LCD device of the present invention without departing form the spirit or scope of the invention. Thus, it is intended that the present invention cover the modifications and variations of this invention provided they come within the scope of the appended claims and their equivalents.

What is claimed is:

1. A transflective liquid crystal display device, comprising:
a first substrate including a plurality of pixel regions, each of the pixel regions having a transmissive portion and a reflective portion, the pixel regions being arranged such that both sides of the transmissive portion of one pixel region adjoin directly to the reflective portions of the other pixel regions adjacent to one pixel region;
a gate line on the first substrate along a first direction;
first and second data lines along a second direction transverse to the first direction and crossing the gate line, each of the first and second data lines including first and second bent portions, a distance between the first bent portions in the first direction being greater than a distance between the second bent portions in the first direction;
an organic layer formed over the gate line and the first and second data lines;
a switching device connected to the gate line and one of the first and second data lines;
a transparent pixel electrode formed in the transmissive portion and connected to the switching device;
a reflective layer formed in the reflective portions, the reflective layer having an open portion that exposes the transparent pixel electrode on the transmissive portion, the reflective layer covering the gate line and the first and second data lines, the organic layer covered by the reflective layer having a step profile at a side portion along a periphery of the organic layer; and
a liquid crystal layer between the first substrate and a second substrate,
wherein the transparent pixel electrode occupies a first space between the first bent portions of the first and second data lines, and the reflective layer occupies a second space between the second bent portions of the first and second data lines, and
wherein a maximum width of the transparent pixel electrode in the open portion is larger than a maximum width of the reflective layer.

2. The device according to claim 1, wherein a width of the transmissive portion in the first direction is greater than a width of the reflective portion in the first direction.

3. The device according to claim 1, further comprising a black matrix formed on the second substrate and arranged to cover a boundary between the transmissive portion and the reflective portion among the adjoining pixel regions.

4. The device according to claim 3, wherein a width of the black matrix corresponds to a width of the step profile.

5. The device according to claim 3, wherein the black matrix is formed along the second direction.

6. The device according to claim 1, wherein a first thickness of the liquid crystal layer in the reflective portion is less than half of a second thickness of the liquid crystal layer in the transmissive portion.

7. The device according to claim 1, wherein the switching device includes a gate electrode, a semiconductor layer, a source electrode, and a drain electrode.

8. The device according to claim 1, wherein the organic layer includes one of acrylic resin and benzocyclobutene.

9. The device according to claim 1, wherein the reflective layer includes aluminum.

10. The device according to claim 1, wherein the transparent pixel electrode includes one of indium tin oxide and indium zinc oxide.

11. The device according to claim 1, wherein each of the first and second data lines has a zigzag shape.

12. The device according to claim 1, wherein the reflective layer shields the organic layer and the pixel electrode is formed over the reflective layer, wherein the pixel electrode is spaced apart from an adjacent pixel electrode.

13. The device according to claim 1, wherein the reflective layer completely covers the gate line and the first and second data lines.

14. A method of fabricating a transflective liquid crystal display device, comprising:
forming a gate line on a first substrate along a first direction, the first substrate including a plurality of pixel regions, each of the pixel regions having a transmissive portion and a reflective portion, the pixel regions being arranged such that both sides of the transmissive portion of one pixel region adjoin directly to the reflective portions of the other pixel regions adjacent to one pixel region;
forming first and second data lines along a second direction transverse to the first direction and crossing the gate line, each of the first and second data lines including first and second bent portions, a distance between the first bent portions in the first direction being greater than a distance between the second bent portions in the first direction;
forming an organic layer covering the gate line and the first and second data lines;
forming a switching device connected to the gate line and one of the first and second data lines;
forming a transparent pixel electrode in the transmissive portion and connected to the switching device;
forming a reflective layer in the reflective portions, the reflective layer having an open portion that exposes the transparent pixel electrode on the transmissive portion, the reflective layer covering the gate line and the first and second data lines, and the organic layer covered by the reflective layer having a step profile at a side portion along a periphery of the organic layer;
attaching the first substrate and a second substrate; and
forming a liquid crystal layer between the first substrate and the second substrate,
wherein the transparent pixel electrode occupies a first space between the first bent portions of the first and second data lines, and the reflective layer occupies a second space between the second bent portions of the first and second data lines, and
wherein a maximum width of the transparent pixel electrode in the open portion is larger than a maximum width of the reflective layer.

15. The method according to claim 14, wherein a width of the transmissive portion in the first direction is greater than a width of the reflective region in the first direction.

16. The method according to claim 14, wherein the forming the switching device comprises:
forming a gate electrode connected to the gate line;
forming a semiconductor layer over the gate electrode;
forming a source electrode connected to the first and second data lines; and
forming a drain electrode spaced apart from the source electrode.

17. The method according to claim 14, further comprising forming a black matrix on the second substrate and arranged to cover a boundary between the transmissive portion and the reflective portion among adjoining pixel regions.

18. The method according to claim 17, wherein a width of the black matrix corresponds to a width of the step profile.

19. The method according to claim 14, wherein the reflective layer completely covers the gate line and the first and second data lines.

20. The device according to claim 1, wherein:
each of the first and second data lines include a first side portion and a second side portion opposite to the first side portion; and
the first side portion adjoins directly the transmissive portion and the first side portion corresponding to the second side portion adjoins directly the reflective portion.

21. The device according to claim 1, wherein:
the gate line includes a first side portion and a second side portion opposite to the first side portion; and
the first side portion adjoins directly the transmissive portion and the first side portion corresponding to the second side portion adjoins directly the reflective portion.

22. The method according to claim 14, wherein:
each of the first and second data lines include a first side portion and a second side portion opposite to the first side portion; and
the first side portion adjoins directly the transmissive portion and the first side portion corresponding to the second side portion adjoins directly the reflective portion.

23. The method according to claim 14, wherein:
the gate line includes a first side portion and a second side portion opposite to the first side portion; and
the first side portion adjoins directly the transmissive portion and the first side portion corresponding to the second side portion adjoins directly the reflective portion.

24. The device according to claim 1, wherein:
the transmissive portion is a rectangular shape including first to fourth sides;
the first to third sides of the transmissive portion of one pixel region adjoin directly to the reflective portions of the other pixel regions adjacent to one pixel region; and
the fourth side of the transmissive portion of one pixel region adjoins directly to the reflective portions of one pixel region.

25. The device according to claim 1, wherein:
the first bent portion of the first data line is opposite the first bent portion of the second data line;
the second bent portion of the first data line is opposite the second bent portion of the second data line;
the first bent portion of the first data line is bent to the right;
the first bent portion of the second data line is bent to the left;
the second bent portion of the first data line is bent to the left; and
the second bent portion of the second data line is bent to the right.

* * * * *